(12) United States Patent
Oney

(10) Patent No.: US 6,454,220 B1
(45) Date of Patent: Sep. 24, 2002

(54) EVACUATION SLIDE WITH TOE END CENTER SUPPORT MEMBER

(75) Inventor: Ted H. Oney, Gilbert, AZ (US)

(73) Assignee: Goodrich Coporation, Charlotte, NC (US)

(*) Notice: Subject to any disclaimer, the term of this patent is extended or adjusted under 35 U.S.C. 154(b) by 0 days.

(21) Appl. No.: 09/976,479

(22) Filed: Oct. 11, 2001

(51) Int. Cl.[7] .............................................. B64D 25/00
(52) U.S. Cl. ..................... 244/905; 182/48; 193/25 B
(58) Field of Search ............................ 244/905, 137.2; 182/48; 193/25 B

(56) References Cited

U.S. PATENT DOCUMENTS

| 3,070,203 A | * | 12/1962 | Hailstone |
| 3,102,623 A | * | 9/1963 | Schacht et al. |
| 3,554,344 A | * | 1/1971 | Summer |
| 3,827,094 A | * | 8/1974 | Fisher |
| 3,833,088 A | * | 9/1974 | Chacko et al. |
| 5,301,630 A | * | 4/1994 | Genovese et al. |
| 5,975,467 A | * | 11/1999 | O'Donnell et al. |

* cited by examiner

*Primary Examiner*—Charles T. Jordan
*Assistant Examiner*—T. Dinh
(74) *Attorney, Agent, or Firm*—Jerry J. Holden

(57) ABSTRACT

An inflatable evacuation slide includes a feature to ensure against buckling of the sliding surface under load. In one embodiment, the slide is made from a fabric sliding surface stretched between two lateral side rail tubes. The lateral side rail tubes are supported by a plurality of transverse tubes and transverse trusses such that the side rail tubes maintain the sliding surface in a taut condition suitable for use as a slide. The foot end of the slide includes an additional longitudinal tube extending from the toe end partway toward the head end of the slide. This toe end longitudinal tube acts as a pneumatic spring to support a sliding passenger as he or she reaches the extreme toe end of the evacuation slide.

5 Claims, 2 Drawing Sheets

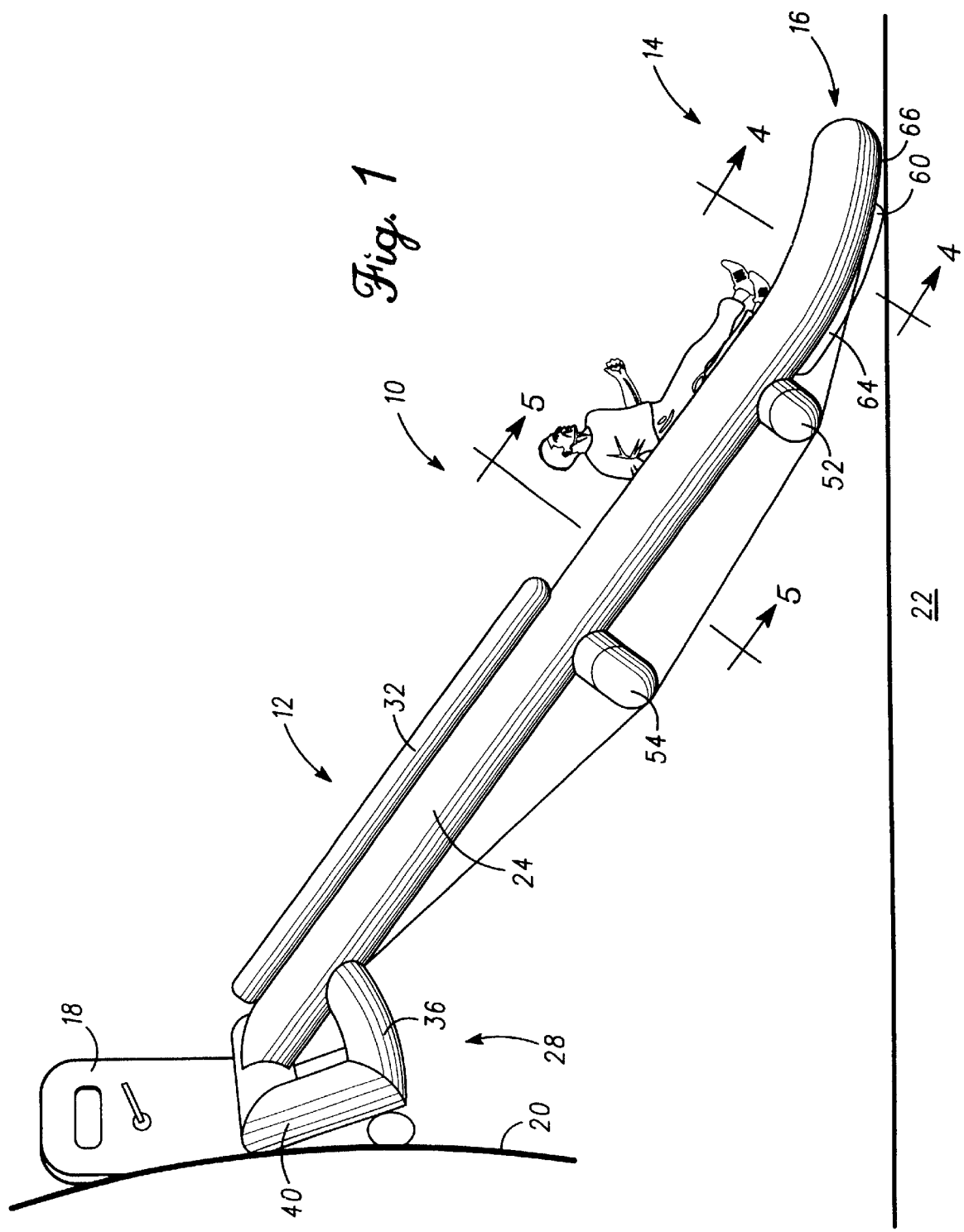

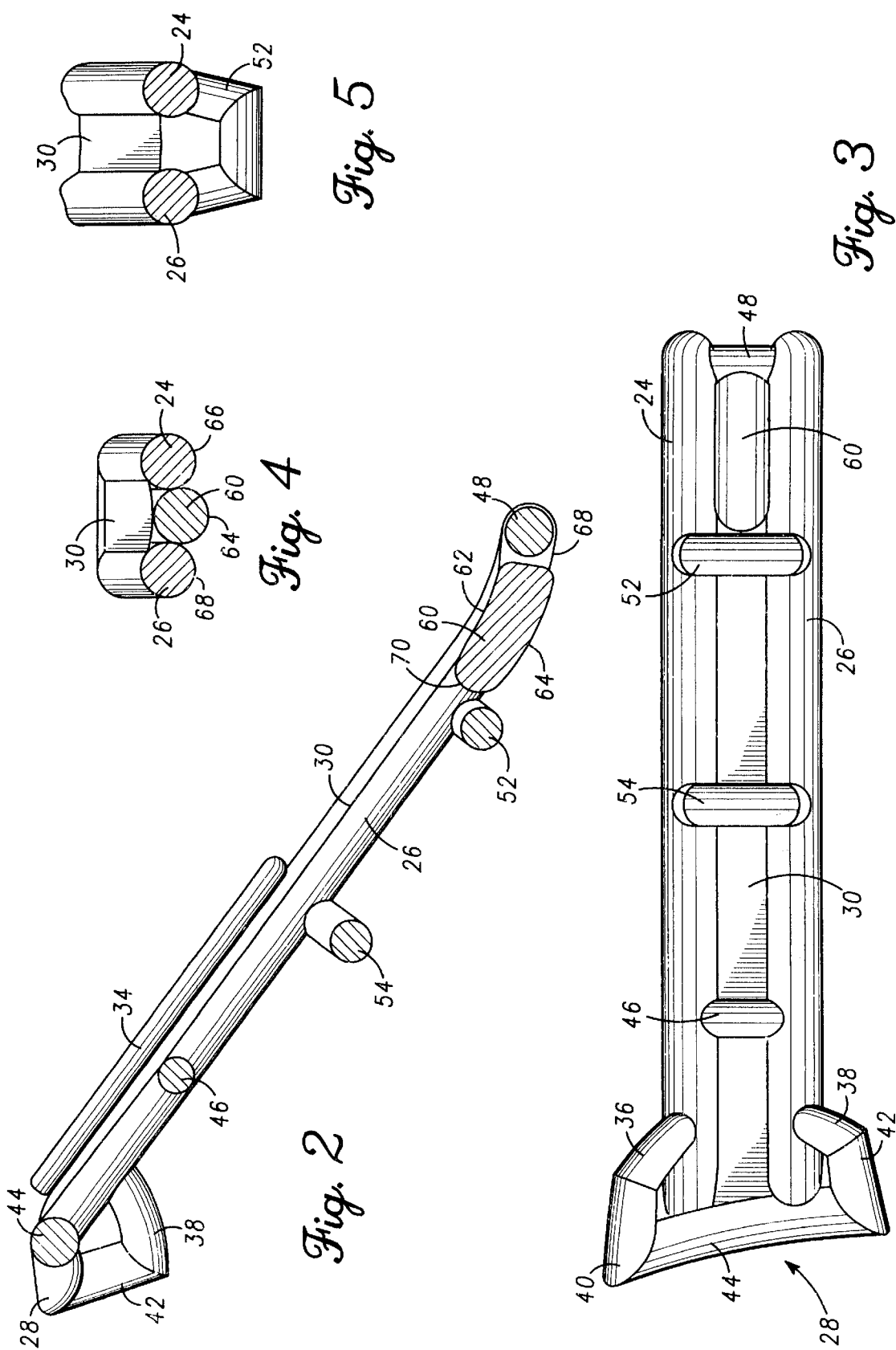

EVACUATION SLIDE WITH TOE END CENTER SUPPORT MEMBER

BACKGROUND OF THE INVENTION

This invention relates to emergency evacuation equipment for aircraft and, in particular, to an inflatable aircraft evacuation slide.

The requirement for reliably evacuating airline passengers in the event of an emergency is well known. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Although evacuation slides permit passengers to quickly and safely descend from the level of the aircraft exit door to the ground, conventional evacuation slides are highly flexible and in some cases will even buckle at the lower "foot" end under the weight of large or obese passengers or under the weight of multiple passengers bunched together tightly on the slide. If an evacuation slide buckles sufficiently under the weight of the passenger, the sliding surface may come in contact with the ground, thereby allowing the passengers to strike the hard surface of the ground during their descent. Worse, a buckled sliding surface may cause a passenger to come to rest in a seated position that is too low for the passenger to quickly gain a footing and move away from the foot of the slide. In an emergency situation, a passenger that is slow to exit the foot end of the slide may be struck by the next passenger descending the slide.

Prior art inflatable evacuation slides typically comprise several parallel inflatable tubular members attached together to form the sliding surface of the evacuation slide. Such slide construction is disclosed, for example, in U.S. Pat. No. 3,669,217 to Fisher and U.S. Pat. No. 4,434,870, also to Fisher. Use of multiple parallel tubes creates a rigid sliding surface that for the most part prevents the passenger from striking the hard ground, but at the cost of substantial weight devoted to the multiple tubes and, in any event, many such slides still do not provide sufficient rigidity at the foot end to avoid passengers coming to rest in a position that is too low to allow them to get to their feet quickly and move away from the foot end of the slide.

The requirement that aircraft evacuation slides be made lighter and lighter weight has lead to the current generation aircraft evacuation slides which comprise a pair of relatively large inflatable tubular side rail members with a fabric sliding surface stretched therebetween. Transverse tubes at the head end and the toe end of the slide maintain the side rails in a spaced apart configuration while a plurality of lower truss members in combination with one or more straps provide the needed rigidity for the light weight design. Unfortunately, these lightweight evacuation slides with a membrane sliding surface exacerbate the problems associated with the large or obese passenger potentially striking the ground and/or coming to rest in a position that prevents them from quickly getting to their feet, because the membrane sliding surface is highly flexible under load.

Accordingly, what is needed is a membrane sliding surface evacuation slide having sufficient rigidity and springiness at the foot end to prevent buckling of the foot end and thereby (1) ensure that a sliding passenger will come to rest at the end of the slide sufficiently elevated to quickly gain a footing and move away from the end of the slide; and (2) ensure the sliding surface does not come in contact with the hard surface of the ground.

SUMMARY OF THE INVENTION

The present invention comprises an inflatable evacuation slide having a feature to ensure against buckling of the sliding surface under load. In one embodiment, the slide comprises a fabric sliding surface stretched between two lateral side rail tubes. The lateral side rail tubes are supported by a plurality of transverse tubes and transverse trusses such that the side rail tubes maintain the sliding surface in a taut condition suitable for use as a slide. The foot end of the slide includes an additional longitudinal tube extending from the toe end to a position just short of the lowermost transverse truss. This toe end longitudinal tube acts as a pneumatic spring to support a sliding passenger as he or she reaches the extreme toe end of the evacuation slide. Use of a toe end longitudinal tube permits the evacuation slide to be made of a lightweight construction while still providing the necessary springiness at the toe end to ensure that passengers come to the end of the slide with their posteriors at a sufficient elevation to enable them to move quickly to their feet and away from the end of the slide in an emergency situation.

BRIEF DESCRIPTION OF THE DRAWING

The present invention will be better understood from a reading of the following detailed description, taken in conjunction with the accompanying drawing figures in which like references designate like elements and, in which:

FIG. 1 is a side view of an evacuation slide incorporating features of the present invention;

FIG. 2 is a cutaway view of the evacuation slide of FIG. 1;

FIG. 3 is a bottom view of the evacuation slide of FIG. 1;

FIG. 4 is a cutaway view of the evacuation slide of FIG. 1 taken along line 4—4; and FIG. 5 is a cutaway view of the evacuation slide of FIG. 1 taken along line 5—5.

DETAILED DESCRIPTION

The drawing figures are intended to illustrate the general manner of construction and are not necessarily to scale. In the detailed description and in the figures, specific illustrative examples are shown and herein described in detail. It should be understood, however, that the drawing the figures and detailed description are not intended to limit the invention to the particular form disclosed, but are merely illustrative and intended to teach one of ordinary skill how to make and or use the invention claimed herein and for setting forth the best mode for carrying out the invention.

FIG. 1 shows an inflatable evacuation slide assembly 10 incorporating features of the present invention. Evacuation slide assembly 10 generally comprises a head end 12, a foot end 14 terminating at the toe end 16. Head end 12 is configured to couple evacuation slide assembly 12 to an exit door 18 of an aircraft 20 while foot end 14 is in contact with the ground 22 such that the slide assembly 10 provides a sloping surface to permit the rapid egress of passengers from aircraft 20.

The entire inflatable evacuation slide assembly 10 is preferably fabricated from an air impervious material such as a lightweight fabric that has been coated with an elastomer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all of the chambers comprising the structure are interconnected pneumatically, such that a single pressurized gas source, such as compressed carbon dioxide, nitrogen, argon, a pyrotechnic gas generator or combination thereof may be utilized for its deployment. The main body of evacuation slide assembly 10 comprises side rail tubes 24, 26 which extend from head end truss assembly 28 to the ground. A slide surface 30 comprising a fabric membrane is stretched between side rail tubes 24 and 26 to provide a sliding surface for the disembarking passengers. A right hand rail 32 and a left hand rail 34 are positioned atop side rail tubes 24 and 26, respectively, to prevent passengers descending evacuation slide assembly 10 from falling off. Head end truss assembly 28 comprises a plurality of strut tubes 36, 38, upright tubes 40, 42 and a transverse tube 44 adapted to hold head end 12 of evacuation slide assembly 10 against the fuselage of aircraft 20 in an orientation to permit escape slide assembly 10 to unfurl in a controlled manner as it extends toward the ground.

The spaced apart configuration of side rail tubes 24 and 26 is maintained by a head end transverse tube 46 and a toe end transverse tube 48. The bending strength of escape slide assembly 10 is enhanced by means of one or more tension straps 50 stretched from toe end 16 over foot end transverse truss 52, medial transverse truss 54 and attached proximal head end 12 of evacuation slide assembly 10. As described, evacuation slide assembly 10 provides a lightweight structure that consumes a minimum amount of inflation gas while providing the necessary structural rigidity to permit passengers to safely evacuate an aircraft under emergency conditions.

Unfortunately, in the as-deployed condition, sliding surface 30 is sufficiently flexible that under the weight of a larger or obese passenger, foot end 14 may buckle. If slide 10 buckles sufficiently under the weight of the passenger, the sliding surface may come in contact with the ground, thereby allowing the passenger to strike the hard surface of the ground during his or her descent. Worse, a buckled sliding surface may cause the passenger to come to rest in a seated position that is too low for the passenger to quickly gain a footing and move away from the foot of the slide.

The inventors of the present invention determined that if an additional pneumatic spring were added immediately above toe end transverse tube 48 in the form of a toe end longitudinal tube 60, the desired additional resiliency could be effected. As shown in FIG. 2, toe end longitudinal tube 60 comprises an inflatable tubular member disposed between side rail tube 24 and side rail tube 26. The upper surface 62 of toe end longitudinal tube 60 is in contact with and supports slide surface 30. Lower surface 64 of toe end longitudinal tube 60 extends below the curvilinear surface defined by lower surfaces 66 and 68 of side rail tubes 24 and 26, respectively. (Where side rail tubes 24 and 26 are straight, of course, the curvilinear surface becomes a plane. Accordingly, as used herein the curvilinear surface defined by the lower surfaces 66 and 68 of side rail tubes 24 and 26 may be planar). As shown in FIG. 1, with evacuation slide assembly 10 deployed, the portion of lower surface 64 nearest toe end 16 is in contact with the ground while that portion of lower surface 64 that is closest head end 12 is not in contact with the ground. A passenger descending sliding surface 30 and thereby causing sliding surface 30 to deform downward will, upon reaching toe end longitudinal tube 60, cause the head end 70 of toe end longitudinal tube 60 to deform downward and come into contact with the ground as the passenger makes a smooth transition onto the toe end portion of slide surface 30, which is now supported by toe end longitudinal tube 60. This prevents the passenger from coming to an abrupt halt upon striking head end 70 of toe end longitudinal tube 60. The deformation of toe end longitudinal tube 60 downward enables toe end longitudinal tube 60 to gradually support the passenger's weight and provide the resiliency needed to support the passenger at toe end 16 of the evacuation slide assembly 10, thus enabling the passenger to make a quick and safe exit from the evacuation slide.

Although certain illustrative embodiments and methods have been disclosed herein, it will be apparent from the foregoing disclosure to those skilled in the art that variations and modifications of such embodiments and methods may be made without departing from the spirit and scope of the invention. For example, in lieu of a separate toe end transverse tube and toe end longitudinal tube, a single toe end longitudinal tube extending from the toe end of evacuation slide assembly 10 to a position proximal foot end transverse truss 52 would be an acceptable alternative embodiment and therefore is considered within the scope of the present invention. Similarly, although in the illustrative embodiment, toe end longitudinal tube 60 extends from the toe end of evacuation slide assembly 10 to a position just short of foot end transverse truss 52, depending on the beam strength of the side rail tubes 24 and 26, a toe end longitudinal tube extending further toward the head end 12, even as far as the mid-point of the evacuation slide assembly 10 (e.g. as far as medial transverse truss 54) may be appropriate and is also considered within the scope of the present invention. Accordingly, it is intended that the invention shall be limited only to the extent required by the appended claims and the rules and principles of applicable law.

What is claimed is:

1. An inflatable escape slide assembly adapted to extended from an elevated supporting surface to a lower supporting surface, said inflatable escape slide assembly comprising:

a flexible panel defining a slide surface having first and second lateral edges and extending from a head end of the inflatable escape slide assembly to a foot end of the inflatable escape slide assembly;

first and second side rail members attached to said first and second lateral edges of said flexible panel, said first and second side rail members each comprising an inflatable tubular member extending from the head end to the foot end of the inflatable escape slide assembly, said first and second side rail members being disposed in a spaced-apart configuration for supporting said flexible panel; and a toe end longitudinal tube, said toe end longitudinal tube comprising an inflatable tubular member disposed between said first and second side rail members and beneath said flexible panel, said toe end longitudinal tube extending from a position proximal the foot end of said inflatable escape slide assembly to a position short of the mid-point of said inflatable escape slide assembly.

2. The escape slide assembly of claim, 1 further comprising:

a toe end transverse tube, said toe end transverse tube comprising an inflatable tubular member extending from said first side rail member to said second side rail member at the foot end of the inflatable escape slide assembly.

3. The escape slide assembly of claim 1, further comprising:

A foot end transverse truss located in that half of the inflatable escape slide assembly proximal the foot end, said foot end transverse truss comprising a u-shaped inflatable tubular member extending from said first side rail member to said second side rail member.

4. The escape slide assembly of claim 3, wherein:

said toe end longitudinal extends from a position proximal the foot end of said inflatable escape slide assembly to a position short of the foot end transverse truss.

5. The escape slide assembly of claim 1, wherein:

said first and second side rail members each define an upper surface and a lower surface; and said toe end longitudinal tube comprises a lower surface that extends below a curvilinear surface defined by the lower surfaces of said first and second side rail members.

* * * * *